United States Patent [19]

Vass et al.

[11] Patent Number: 5,660,760
[45] Date of Patent: Aug. 26, 1997

[54] MAGNETIC COATING DISPERSION

[75] Inventors: Attila Vass; Wolf-Dieter Schroeer, both of Munich; Hans-Heinrich Credner, Hohenschaeftlarn; Hildegard Fischer, Munich, all of Germany

[73] Assignee: BASF Magnetics GmbH, Mannheim, Germany

[21] Appl. No.: 688,216

[22] Filed: Jul. 29, 1996

Related U.S. Application Data

[63] Continuation of Ser. No. 307,104, Sep. 16, 1994, abandoned, which is a continuation of Ser. No. 54,065, Apr. 29, 1993, abandoned.

[51] Int. Cl.$^6$ .................................................. G11B 5/712
[52] U.S. Cl. ............... 252/62.54; 427/128; 428/694 BA; 428/900
[58] Field of Search ................................ 428/694, 900, 428/13 A; 252/62.54; 427/128

[56] References Cited

U.S. PATENT DOCUMENTS

| | | | |
|---|---|---|---|
| 3,647,539 | 3/1972 | Weber | 428/694 |
| 4,001,288 | 1/1977 | Gable et al. | 260/439 R |
| 4,253,886 | 3/1981 | Aonoma et al. | 148/105 |
| 4,421,660 | 12/1983 | Solc Nee Hajna | 252/62.54 |
| 4,824,587 | 4/1989 | Kwon et al. | 252/62.55 |
| 5,019,416 | 5/1991 | Honzawa | 427/47 |
| 5,142,001 | 8/1992 | Yasuda et al. | 525/453 |
| 5,158,830 | 10/1992 | Yasuda et al. | 428/425.9 |
| 5,246,810 | 9/1993 | Hagiwara et al. | 430/110 |
| 5,415,929 | 5/1995 | Vass et al. | 428/323 |

Primary Examiner—Stevan A. Resan
Attorney, Agent, or Firm—Keil & Weinkauf

[57] ABSTRACT

In the preparation of dispersions of magnetic pigments, it was found that excellent dispersion stability is achieved when compounds which are selected from the group consisting of quaternary ammonium compounds, guanidines, piperidines, alkylated or ethoxylated amines, diamines, polyamines or mixtures thereof, ethanolic KOH solutions, metal alkoxylates, Grignard compounds and certain metal hydrides are used as codispersants. The compounds are added in an amount of 0.15–4% by weight, based on the magnetic pigment.

6 Claims, No Drawings

MAGNETIC COATING DISPERSION

This application is a continuation of application Ser. No. 08/307,104, filed on Sep. 16, 1994 now abandoned, which is a continuation of Ser. No. 08/054,065, filed on Apr. 29, 1993 now abandoned.

The present invention relates to a magnetic recording medium consisting of a nonmagnetic substrate and at least one magnetic dispersion applied thereon and containing finely divided magnetic pigments, which are dispersed in a polymeric binder, and codispersants.

The development of magnetic recording media has for many years been directed toward achieving higher recording density and improved signal/noise ratio. To improve these properties, the pigment concentration of the magnetic layer must be increased and good surface smoothness must be achieved by improving the dispersion and the orientation of the finely divided magnetic pigments, which must have excellent magnetic properties.

A further requirement for magnetic recording media having high recording density is a layer which is free of interfering particles. This can be achieved on the one hand only with magnetic dispersions which contain no agglomerates. On the other hand, the magnetic dispersion must be filtered using filters having an extremely small pore size (about 5 μm).

In order to obtain the desired dispersion properties, it is essential to use certain binders which have both good binding properties and good dispersion properties for the magnetic pigment. Such dispersant compounds are referred to below as dispersing resins. In the magnetic dispersions, a certain proportion of the polymeric binder, from 2 to 100%, is replaced with active high molecular weight or low molecular weight dispersing resins which have a very good affinity to finely divided magnetic pigments. Here, the dispersing resins are understood as meaning chemical compounds which are obtained from monomer building blocks by polymerization, polycondensation or polyaddition and which contain at least one polar group suitable for adsorption onto the surface of the magnetic pigment. However, the viscosity of the magnetic dispersion may consequently be increased to an extremely great extent, resulting in difficulties which are all the greater the more finely the magnetic pigment and which are described in detail below.

In particular, magnetic dispersions which contain finely divided pigments having a BET value of more than 35 $m^2/g$ as magnetic pigment can, together with the conventional formulation components, such as polymeric binders, have a high flow limit and can therefore be filtered only with difficulty and using special filtration units, particularly if the magnetic dispersion stands for a long time during production, which can easily occur, for example, during a stoppage in production. If an increase in fineness or pigment batch fluctuations leads to an increase in the secondary agglomerates, filter break-through may occur, resulting in a dramatic reduction in the yield of tape material.

There has been no lack of attempts to achieve the required homogeneity of the dispersion.

A certain degree of homogeneity can be achieved by thorough milling of the magnetic dispersion, but interlocking or sintering of the pigment agglomerates to different extents results in the more readily dividable pigment fraction being already highly overmilled before the sintered pigment needle fraction has been sufficiently comminuted. Particularly in the case of metal pigments, the surface layer which provides stabilization against oxidation may be destroyed.

German Laid-Open Application DOS 3,905,910 proposes adding dispersant during the fine dispersing of the magnetic dispersion in a plurality of stages at the rate of which new pigment surface is continuously formed by the dispersing process. DE 10 05 754 discloses that certain phosphoric esters can be added to reduce the viscosity of the dispersion produced using conventional binders. Furthermore, German Laid-Open Application DOS 2,535,277 and U.S. Pat. No. 4,533,565 disclose that the surface of the magnetic pigments can be coated with certain compounds, such as polymerizable alkylene oxides or compounds having polar groups, before they are added to the magnetic dipersion. DE 22 50 384 describes alkylarylsulfonic acids, alone or as a mixture with phosphoric esters or with alkoxylated alkylphenols, as dispersants for a magnetic recording medium which contains $CrO_2$ as magnetic pigment.

German Application P 40 34 747 describes low molecular weight mono- or diesters of phosphoric acid which are used in combination with a dispersant resin, the latter containing at least one polar group capable of adsorption onto the magnetic pigment.

Several publications by F. M. Fowkes, in particular Colloids and Surfaces in Reprographic Technology, ACS Symposium Series 200, Am. Chem. Soc. (1982), 307, Polymer Adsorption and Dispersion Stability, ACS Symposium Series 240, Am. Chem. Soc. (1984), 331, Ceramic Powder Science and Technology; Advances in Ceramics, 21 (1987), 411, J. Adhesion Sci. Techn., 1 (1987), No. 7, disclose that the electrostatic repulsion helps to stabilize dispersions in organic media. For this purpose, there must be an ionic interaction between the dispersant and the pigment surface (acid-base interaction), and an excess of non-adsorbed dispersant leads to charge generation on the pigment surface. The corresponding acids or bases formed, solvated as a diffuse ionic layer, stabilize the charge build-up on the pigments. On the other hand, any skilled worker in the magnetic sector knows that an excess of nonadsorbed dispersant has adverse effects on the mechanical, magnetic and storage properties of the magnetic recording media.

It is an object of the present invention to provide a magnetic recording medium of the generic type defined at the outset, in which, during the preparation of the magnetic dispersion, optimum uniform charging of the pigment surfaces and hence an increase in the dispersion stability, a low flow limit and a flat τ-D curve (shear stress/shear rate) are obtained, resulting in good mechanical and magnetic properties of the recording medium.

We have found that this object is achieved, according to the invention, by a magnetic recording medium consisting of a nonmagnetic substrate and at least one magnetic dispersion applied thereon and containing finely divided magnetic pigments, which are dispersed in a polymeric binder, and codispersants, wherein the codispersant is selected from the group consisting of quaternary ammonium compounds
guanidines
piperidines
alkylated or ethoxylated amines, in particular diamines exhibiting tertiary substitution, polyamines or mixtures thereof
ethanolic KOH solutions
metal alkoxylates
Grignard compounds and certain metal hydrides.

The following were determined to be suitable codispersants for the purposes of the present invention 1. Quaternary ammonium compounds, for example tetra-n-alkylammonium hydroxide
2. Guanidines, for example pentaalkylguanidine or pentaisoalkylguanidine (alkyl=$CH_3$—$C_3H_8$)

3. Piperidines, for example 1,2,2,6,6-pentamethylpiperidine

4. Alkylated or ethoxylated amines, preferably diamines exhibiting tertiary substitution, polyamines or mixtures thereof 5. Ethanolic KOH solutions 6. Metal alkoxylates, for example aluminum sec-butylate, aluminum tert-butylate, aluminum ethylate or aluminum isopropylate potassium tert-butylate, potassium ethylate or potassium methylate sodium ethylate, sodium methylate or sodium tert-amylate 7. Grignard compounds, for example
methylmagnesium chloride
methylmagnesium iodide
methylmagnesium bromide 8. Metal hydrides, in particular sodium borohydride ($NaBH_4$), sodium tetrahydridoborate (sodium boronate) or the corresponding Li or K compounds lithium aluminum hydride ($LiAlH_4$) or lithium tetra-hydridoaluminate (lithium alanate) LiH, NaH, KH in oil or lithium hydride as a suspension $NaNH_2$ as a suspension in toluene (sodium amide) $LiNH_2$, potassium tri-sec-butylborohydride or K selectrides Of course, the stated codispersants may also be combined with other codispersants, for example lecithin, cephalin, fatty amines or fatty diamines, fatty amides or fatty diamides, fatty acids or ammonium salts thereof, ethoxylated fatty acid derivatives, aliphatic or aromatic phosphoric esters which may be ethoxylated, sulfosuccinic esters, sorbitan esters, sulfonates, fatty alcohol sulfates and others.

Suitable magnetic pigments are $CrO_2$ or $Y-Fe_2O_3$, ferrites, in particular Co ferrites, and metal pigments having an oxidic surface, for example an $Al_2O_3$ layer or an $MeSiO_3$ layer, or mixtures thereof.

Examples of binders for the novel magnetic recording medium are copolymers of vinyl chloride, vinyl acetate and vinyl alcohol, copolymers of vinylidene chloride and acrylonitrile, polyvinyl acetals, such as polyvinyl formals, polyester/polyurethanes, polycarbonate/polyurethanes, polyurethane elastomers or polyether elastomers, phenoxy or epoxy resins and mixtures thereof and the abovementioned dispersing resins.

Examples of solvents which may be used for all abovementioned polymeric binders are tetrahydrofuran, dioxane, dimethylformamide, cyclohexanone, methyl ethyl ketone, toluene, methyl isobutyl ketone and others, if necessary also as a mixture.

Further formulation components may be used depending on the desired properties of the dispersion or of the prepared layer. Lubricants, for example fatty acids or fatty acid derivatives, silicone oils, paraffins, waxes, fluorinated oils or dispersions of polytetrafluoroethylene, are particularly suitable. Other possible additives are, for example, plasticizers, abrasives, crosslinking agents and if required crosslinking catalysts, viscosity regulators and others.

The novel codispersants can be introduced by precoating the pigments in the dispersion in a mixing apparatus under high shear forces, for example in a kneader, a colloid mill, a ball mill or an attritor. The dispersant may furthermore be added during fine dispersing, for example in a sand mill whose milling intensity can be controlled by varying the grinding medium size and load, the speed and the coating throughput.

The subsequent coating of the nonmagnetic substrate with the magnetic dispersion is carried out according to the prior art, for example by means of a reverse-roll coater, a doctor blade or an an extrusion coater.

The substrates used may be films of polyester, such as polyethylene terephthalate, polyolefins, such as polypropylene, cellulose derivatives, such as triacetate, polycarbonates or rigid substrates of nonmagnetic metals, such as aluminum, or ceramic materials.

The further processing of the coated materials, such as surface smoothing by calendering, slitting and finishing, are carried out in a known manner.

The amount of dispersants used is evident from the Examples. In general, it is sufficient to add the codispersant in an amount of from 0.15 to 4% by weight, based on the magnetic pigment.

EXAMPLES 1 TO 5

A magnetic dispersion having the following composition 1 was prepared, after the addition of the dispersant fine milling being carried out for 6 hours in a stirred ball mill in the presence of ceramic grinding media having a diameter of 0.8–1.2 mm. Thereafter, a) the theological data ($\tau p$, $\tau 500$) were measured, $\tau p$ being the flow limit (Pa) and $\tau 500$ being the shear stress (Pa), measured at a shear rate of 500 $s^{-1}$.

b) A wet coating having a wet layer thickness of 50 μm on a glass sheet was measured optically to determine the gloss.

| Composition | Parts by weight |
|---|---|
| $CrO_2$ (BET = 30 $m^2$/g, $IH_c$ = 52 kA/$m^2$) | 100 |
| Codispersant | (Table) |
| Vinyl chloride copolymer | 3.4 |
| Solvent (tetrahydrofuran, cyclohexanone) | 119 |

Table 1 shows the results, Examples 2 to 5 having the novel composition whereas Example 1 is a Comparative Example which does not correspond to the present invention.

TABLE 1

| Example | Codispersant Type | Codispersant Amount | Dispersant Type | Dispersant Amount | Gloss (scale division) measured at 20° C. | Gloss (scale division) measured at 60° C. | $\tau p$ [Pa] | $\tau 500$ [Pa] |
|---|---|---|---|---|---|---|---|---|
| 1 (Comp.) | | | L | 2.8 | 162 | 148 | 29.1 | 50.1 |
| 2 | B | 0.15 | L | 2.8 | 159 | 148 | 19.5 | 33.0 |
| 3 | B | 0.15 | ED | 2.8 | 86 | 121 | 15 | 25 |
| 4 | B | 0.15 | AD | 2.8 | 111 | 135 | 15.9 | 26.9 |
| 5 | ED, AD | 2.8 | | | 123 | 139 | 10.3 | 17.9 |

The symbols have the following meanings:
L=Highly purified lecithin
B=Tetra-n-butylammonium hydroxide
ED=Ethoxylated alkylpropylenediamine
AD=Alkylpropylenediamine

EXAMPLES 6–9

A magnetic dispersion having the composition 2 stated below was prepared as described above.

Thereafter, the dispersion was filtered through fine Pall profile filters having a pore size of 5 μm and was cast in an extrusion coater onto a 15.2 μm thick 66 cm wide polyethylene terephthalate film to give a dry layer thickness of 2.3 μm, and the layer was dried and then calendered. The pigment volume concentration was 48%.

The magnetic recording medium was slit longitudinally to a half inch width and the relevant mechanical and magnetic characteristics of the magnetic layer were measured. The results are shown in Table 2.

| Composition | Parts by weight |
|---|---|
| $CrO_2$ | 85 |
| Co-doped $\gamma$-$Fe_2O_3$ | 15 |
| Polyester/polyurethane (molecular weight 80,000) | 14.1 |
| Vinyl chloride copolymer | 6.1 |
| Diisocyanate | 3.3 |
| Dispersant | 2.4 |
| Codispersant | 0.15 |
| Fatty acid | 0.6 |
| Fatty ester | 0.8 |
| Solvent (tetrahydrofuran, cyclohexanone) | 209 |

TABLE 2

| Example | Dispersant | Codispersant | Gloss Scale divisions 60° | Roughness $R_z$ (nm) | $\frac{M_R}{M_S}$ | $\frac{S}{N}$ (L) (dB) | FSM (dB) | S/N (Chroma) |
|---|---|---|---|---|---|---|---|---|
| 6 | L | — | 130 | 85 | 0.83 | Comp. | Comp. | Comp. |
| 7 | L | B | 141 | 71 | 0.85 | +0.7 | +0.7 | +1.5 |
| 8 | L | B | 145 | 108 | 0.86 | +0.8 | +1.2 | +1.7 |
| 9 | L | ED, AD | 139 | 75 | 0.84 | | | |

Example 6 (Comparative Example) does not have the novel composition, whereas all other Examples 7–9 correspond to the present invention.

We claim:

1. A magnetic coating dispersion, comprising
   a) a polymeric binder,
   b) a magnetic pigment dispersed in said polymeric binder, and
   c) a codispersant selected from the group consisting of a tetra-n-alkylammonium hydroxide, pentaalkylguanidine, pentaisoalkylguanidine, piperidine and ethanolic KOH solution, said codispersant being present in said dispersion in an amount sufficient to generate a uniform charging of said magnetic pigment.

2. The magnetic coating dispersant of claim 1, wherein said codispersant is contained in an amount of from 0.15 to 4% by weight of said magnetic pigment.

3. The magnetic coating dispersion as defined in claim 1 wherein said magnetic pigment in said dispersion has a particle size of below 5 μm.

4. A process for the preparation of a magnetic recording medium consisting of a nonmagnetic substrate and at least one magnetic dispersion dried thereon, which comprises
   a) coating said nonmagnetic substrate with a magnetic dispersion, and thereafter
   b) drying said magnetic coating dispersion on said nonmagnetic substrate, wherein the magnetic dispersion comprises
      a) a polymeric binder,
      b) a magnetic pigment uniformly dispersed in said polymeric binder, and
      c) a codispersant selected from the group consisting of a tetra-n-alkylammonium hydroxide, pentaalkylguanidine, pentaisoalklguanidine, piperidine and ethanolic KOH solution, said codispersant being present in said dispersion in an amount sufficient to generate a uniform charging of said magnetic pigment.

5. A process for the preparation of a magnetic recording medium as defined in claim 4, wherein the codispersant (c) is contained in an amount of from 0.15 to 4% by weight of said magnetic pigment.

6. The process as defined in claim 4 wherein said magnetic pigment in said dispersion has a particle size of below 5 μm.

* * * * *

UNITED STATES PATENT AND TRADEMARK OFFICE
CERTIFICATE OF CORRECTION

PATENT NO. : 5,660,760
DATED : August 26, 1997
INVENTOR(S) : Vass, et al

It is certified that error appears in the above-indentified patent and that said Letters Patent is hereby corrected as shown below:

On the cover page, insert the following:

--[30] Foreign Application Priority Data
   Apr. 30, 1992   [DE]   Germany   P 42 14 274.1--.

Column 6, claim 4, line 28, "pentaisoalklguanidine" should be --pentaisoalkylguanidine--.

Signed and Sealed this

Eleventh Day of November, 1997

Attest:

BRUCE LEHMAN

*Attesting Officer*          *Commissioner of Patents and Trademarks*